United States Patent [19]

Hyland et al.

[11] 4,086,400
[45] Apr. 25, 1978

[54] CARRIER WEB FOR LAMINAR BATTERIES

[75] Inventors: Albert L. Hyland, Wayland; Victor Mitchnick, Framingham, both of Mass.

[73] Assignee: Polaroid Corporation, Cambridge, Mass.

[21] Appl. No.: 782,837

[22] Filed: Mar. 30, 1977

[51] Int. Cl.² .................. H01M 2/00; H01M 6/12
[52] U.S. Cl. ............................... 429/122; 429/162
[58] Field of Search ............ 429/162, 152, 153, 160, 429/163, 178, 174, 185, 122, 211

[56] References Cited

U.S. PATENT DOCUMENTS

| | | | |
|---|---|---|---|
| 2,649,492 | 8/1953 | Linton et al. | 429/162 X |
| 3,734,780 | 5/1973 | Bilhorn et al. | 429/162 |
| 4,019,251 | 4/1977 | McCole | 29/623.2 |

Primary Examiner—Anthony Skapars
Attorney, Agent, or Firm—John W. Ericson

[57] ABSTRACT

Carrier web and end cell insulator stock for laminar batteries comprising a laminate of paper, a thermoplastic liquid impervious resin, and an overlayer on the resin of a heat sealing adhesive.

6 Claims, 6 Drawing Figures

CARRIER WEB FOR LAMINAR BATTERIES

This invention relates to electrical cells and batteries, and particularly to a novel carrier web and end cell insulating laminate for use in the manufacture of thin flat laminar batteries.

Thin flat laminar batteries are currently manufactured and sold as a component of the Polaroid SX-70 Land film pack, by Polaroid Corporation of Cambridge, Mass. The battery serves as the power source for various automatic cameras adapted to accept the film pack, such as the Polaroid SX-70 Land Camera. One form of battery suited for this purpose, and its method of manufacture, are shown and described in U.S. Pat. No. 4,019,251 issued on Apr. 26, 1977 to Thomas P. McCole for Flat Battery and Method of Manufacture, assigned to the assignee of this application.

Reference is made to the above cited U.S. Pat. No. 4,019,251 for details of the construction and manufacture of batteries of the kind here considered. Briefly, the batteries are made by assembling thin flat laminar components including central active electrode regions in ionic communication through layers of gel electrolyte and electrically connected in series through thin flat conductive plastic intercell connectors and terminal collectors. The central active regions are surrounded by liquid impervious borders formed by interdigitating the conductive plastic layers with adhesive insulating frames, and sealing the border regions of the conductive plastic layers and the frames together with heat and pressure.

In order to effect the desired result of having both terminals accessible on the same side of the battery, for many years it has been the practice to form one end terminal with one side longer than the corresponding sides of the other laminae in the battery, thus making an extending terminal flap that is folded around the battery after sealing, being insulated from the opposite end terminal by an intermediate paper spacer, but to all intents and purpose in the same plane as the opposite end terminal because none of the laminae are more than a few mils in thickness. The paper spacer not only serves as an end cell insulator, but is advantageously initially in the form of an elongated web used to carry other components through the assembly process, as described in the above-cited U.S. Pat. No. 4,019,251.

By careful manufacturing and inspection procedures, excellent yields have been attained in the manufacture of batteries of the kind described in large quantities. However, from time to time defects have occured which were not detected in inspection. The possible causes of defects in batteries are numerous, but most troublesome are those that result in defective seals, with consequent leakage of electrolyte.

Leakage of electrolyte from a cell obviously tends to reduce shelf life, through loss of moisture that dries the cell and increases internal impedance. And leaking cells in batteries can lead to intercell shorts. These effects are reason enough to make every effort to produce good seals in the first place, and to detect any poor seals that may occur. However, a more serious problem may occur if leaking electrolyte comes into contact with the kraft paper carrier web that serves as the insulator between the metal cathode and anode terminals, and is wicked into the paper by capillary action to form a catastrophic dead short of very low impedance across the battery. Batteries of the kind in question are capable of delivering short circuit currents of over 30 amperes, and it has been found that enough heat to start a fire in adjacent combustible materials may be generated by an electrolytic short produced in the manner described. The object of this invention is to reduce the incidence of damage caused by defective seals in laminar batteries.

The above and other objects of this invention are attained by the use of a novel triplex laminate as the carrier web and interterminal insulator in the manufacture of laminar batteries. This laminate comprises a base sheet of strong and inelastic material, preferably kraft or other stout paper that will take the stresses encountered in use as a carrier web without tearing or any appreciable elongation that would cause mis-registration of battery components, in a sheet thin enough to make a negligible contribution to the thickness of the battery. Other materials that might be thought of, for their insulating and water repellant properties, are generally lacking in the strength or dimensional stability required for service as a carrier web. Specifically, Mylar polyester film has been used as the carrier web, and found to be too elastic. Such materials as the non-conductive adhesives, heat sealed or pressure sensitive, which are mentioned for the purpose of sealing and insulating a wrapped terminal in U.S. Pat. No. 3,734,780, for example, are quite unsuited for use as a carrier web, for the same reason.

Over the base sheet is coated a thin barrier layer of a material that is impervious to aqueous electrolyte. The barrier layer is coated with a thin layer of adhesive. The adhesive layer and the barrier layer are chosen on the basis of a number of detailed considerations to be described below. Presently preferred materials are polyethylene for the barrier layer and ethylene/vinyl acetate (EVA) as the adhesive.

The invention will best be understood in the light of the following description, together with the accompanying drawings, of the preferred embodiment of the invention.

Figure 4:
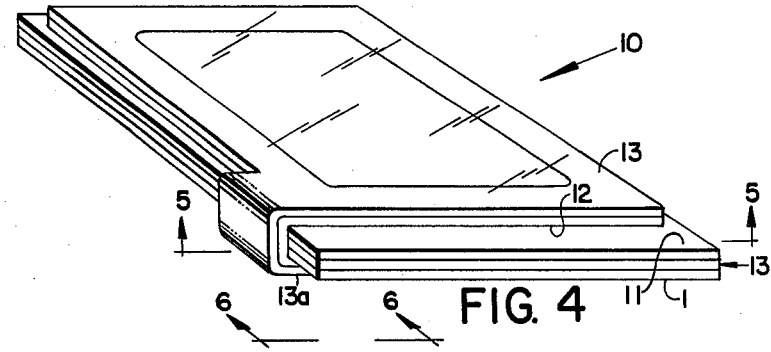
FIG. 4 is a schematic three quarter perspective sketch of a sealed battery made by the process partially illustrated in FIGS. 1 and 3 prior to final packaging.
Figure 5:
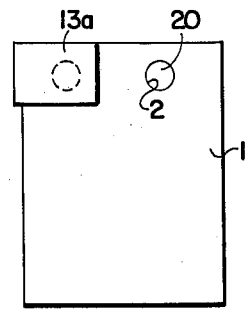
Figure 6:
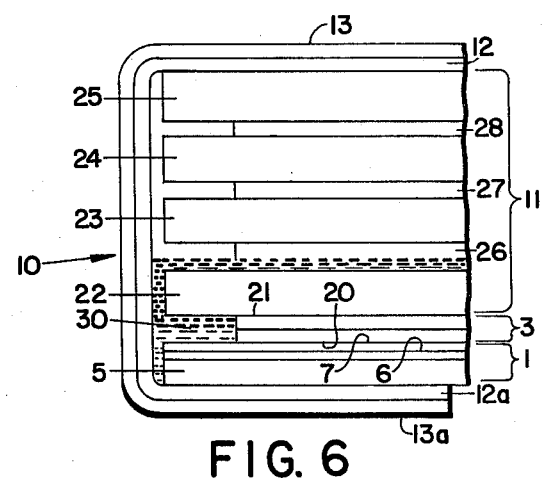

FIG. 5 is a schematic bottom view, on a reduced scale, of the battery of FIG. 4, as seen essentially along the lines 5—5 in FIG. 4; and FIG. 6 is a fragmentary end view, on an enlarged scale and with parts broken away, illustrating a corner of the battery of FIG. 4 as seen along the lines 6–6 in FIG. 4 and illustrating the mode of operation of the laminate of the invention in the event of a leak in the battery.

Figure 1:
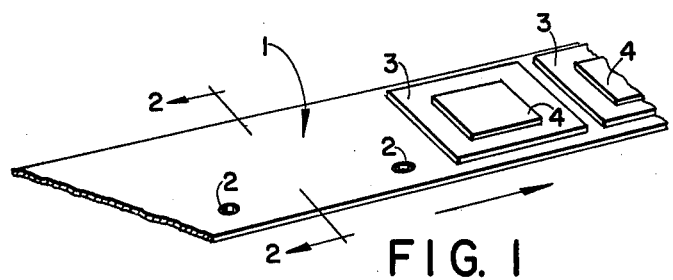
FIG. 1 is a fragmentary schematic perspective sketch, with parts omitted and parts broken away, illustrating the use of a laminate in accordance with the invention as a carrier web in the manufacture of batteries.

FIG. 1 illustrates a portion of a battery manufacturing process which is more fully described in the above cited U.S. Pat. No. 4,019,251. In particular, an elongated strip of carrier web generally designated 1 is used as a support to carry a series of battery components through a process of assembly in which additional components are added as the process proceeds. This process is carried out by pick and place techniques characterized by accelerations and decelerations of the web 1. Any changes in the web dimensions as a result of the forces applied are quite undesirable.

As illustrated, the web is pierced by a series of equally spaced apertures 2, that serve to admit an electrical contact into engagement with the cathode terminal of the completed battery. As suggested in FIG. 1, the web begins with no components and additional components are added as the process proceeds. FIG. 1 shows the addition of cathode terminal assemblies 3 on which are formed cathode patches 4.

Figure 2:
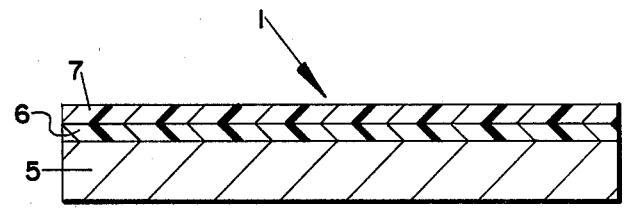
FIG. 2 is a schematic elevational cross sectional sketch, on an enlarged scale, showing the laminate of FIG. 1 as seen essentially along the lines 2—2 in FIG. 1.

FIG. 2 shows the web 1 in more detail. As shown, the web 3 is formed as a laminate comprising a base sheet 5, preferably of kraft paper about 5 mils in thickness. Over this base sheet 5 is coated a layer 6. The layer 6 may typically be 1 mil in thickness and is chosen to be relatively impervious to liquid electrolyte, to have a high electrical impedance, for its coatability, to bond well to the kraft paper, and to adhere well to the supervening layer, to be described. A presently preferred material is extruded low density polyethylene, filled with a small amount of pigment, preferably carbon black. The amount of pigment should be sufficient to be clearly visible; for example, about 4 to 5 percent of carbon black by weight, based on the total weight of pigmented polyethylene.

The reason for the pigment is that the paper 5 is tan in color, and separators which are added in later stages of the assembly process are also tan. The black surface of the sheet 1 provided by the inclusion of carbon has been found to be of great assistance to inspectors seeking to locate misregistered components at specific stages in the manufacturing process. While this aspect of the matter forms no part of the present invention, it should be noted that a misregistered component is a prime cause of defective seals in battery manufacture, so that the detection of such misregistration is a significant aspect of the overall quality control program.

Over the layer 6, is coated, preferably also by extrusion, a thin layer, for example ½ mils in thickness, of an adhesive chosen to be activatable at a relatively low temperature, for the purpose of sealing to the steel or aluminum underside of the cathode terminal 3, and to adhere well to the polyethylene. A presently preferred adhesive for this purpose is a conventional copolymer of ethylene and vinyl acetate, commonly termed EVA.

Figure 3:
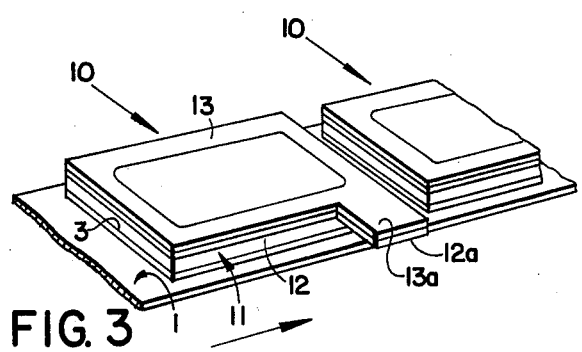
FIG. 3 is a fragmentary schematic three quarter view, with parts omitted and parts broken away, illustrating a later stage in the manufacture of batteries utilizing the laminated carrier web of FIGS. 1 and 2.

FIG. 3 illustrates a stage near the end of the manufacturing process, in which batteries generally designated 10 have finished the final sealing and cold strike stage as described in the above cited application Ser. No. 647,599, and just before the web 1 is cut to separate the batteries for final packaging. At this stage, in addition to the cathode terminal 3, the battery 10 is provided with intermediate layers generally designated 11, some of which will be mentioned in more detail in connection with FIG. 6, and an upper anode terminal subassembly comprising a conductive plastic anode current collector sheet 12 and, adhered thereto, a tinned steel or aluminum anode terminal sheet 13. A portion of the anode terminal assembly is formed as a protruding tab comprising extending portions 12a and 13a of the current collector 12 and the metal terminal 13, respectively, as shown in FIG. 3.

Referring to FIGS. 4, 5 and 6, the tabs 12a and 13a are folded over the carrier web 1 to form an anode terminal in substantially the same plane as the cathode terminal. Provision is later made for access to the tab 13a by an external contact in the region illustrated by the dotted circle in FIG. 5.

As shown in FIGS. 5 and 6, the cathode terminal assembly 3 comprises an external sheet metal cathode terminal 20, of tinned steel, aluminum or the like, accessible through the hole 2 in the web 1 as shown in FIG. 5. Laminated to this metal terminal sheet 20 is a conductive plastic sheet 21 serving as a cathode current collector.

Thermoplastic frames 22, 23, 24 and 25 comprise some of the components generally designated 11 above. These frames are made, for example, by impregnating the edges of liquid permeable separator material with hot melt adhesive.

As shown, the frames 22, 23, 24 and 25 are separated by interdigitated intercell connectors 26, 27 and 28, respectively, of conductive plastic material and formed as duplex electrodes in a manner not shown, but described in the above cited U.S. Pat. No. 4,019,251. During the process of sealing the battery, the frames, intercell connectors and the current collectors 12 and 21 are bonded together by heat and pressure. In the majority of instances, in which this is properly done, there is a liquid impervious seal formed around the liquid electrolyte contained in the cells in the interior of the battery.

FIG. 6 illustrates the situation in which a seal has not been properly formed between one of the intercell connectors 26 and one of the frames 22, allowing a leakage of electrolyte 30 in a fashion that is rather grossly exaggerated in FIG. 6 from the usual typical case. It will be apparent that if the carrier web 1 was made entirely of paper, and such a leakage occurred under the anode flap 12a and 13a, there would be low impedance short circuit from the terminal 13a through the conductive plastic 12a and thence through the electrolyte wet paper to the cathode metal terminal 20.

One approach to the early detection of leaks, and to a large measure successful in alleviating the damage caused thereby, is the use of an anode flap 12a and 13a disclosed herein and more fully described and claimed in copending U.S. application Ser. No. 782,836, filed concurrently with this application by Albert L. Hyland and Robert G. Keene for Laminar Batteries and assigned to the assignee of this application. As pointed out in that application, the previous practice in manufacturing thin, flat laminar batteries was to use an anode flap extension corresponding to the extension 12a and 13a but extending the full length of the battery. It was found that by reducing the area of this extension to the minimum necessary for its electrical function, both early detection of leaks was facilitated and consequences were minimized. First, reducing the size of the anode flap increases the visible area of the carrier web available for inspection. Secondly, the area of the carrier web in which such a leak could be covered over, and hence would not quickly evaporate, was greatly reduced, enhancing the possibility that any leakage that occurred would evaporate as the liquid emerged from the battery so that no large pool of electrolyte could form. However, there still remains in the necessary portion of the flap 13a a fairly substantial region in which destructive shorts could occur.

It will be apparent a leaking pool of electrolyte 30, as shown in FIG. 6, would create an intercell short. Such shorts are frequently of relatively high impedance, and, while damaging to the battery, are not usually dangerous to surrounding material. Also, though the possibilities are greatly distorted in FIG. 6, it will be apparent that some of the electrolyte 30 could leak into the edge of the paper 5 around the insulating layer 6 and 7. The extent of this effect is presumed to be relatively small, because of the considerable improvement in yields and reliability experienced following the adoption of the invention in practice, particularly together with the adoption of the reduced anode flap area. It will be apparent, however, that wetting of the paper 5 that occurs in this fashion will not cause an end terminal short because of the intervening high impedance liquid impervious layers 6 and 7. Any capillary action that may take place through this cause would of course expedite drying out the cell. This would not necessarily reduce the life of the cell, more than it was already reduced by the intercell short present when the electrolyte 30 is in the wrong place. It may be that such action, if it occurred, would in fact assist in reducing damage from this cause. Moreover, particularly in locations of the carrier web 1 other than directly under the terminal 13a, any wicking of electrolyte into the edge of the paper 5 would most certainly expedite the drying out of the electrolyte. Another possible advantage of any edge wicking that might occur is that it would cause a damp spot to appear on the visible portion of the carrier web 1, facilitating early detection of leaky cells, and leading to a solution to the problem which caused the leak in the first place. Whatever the correct theoretical explanation may be, the fact is that the improvement in quality and reduction in damage following the adoption of the invention has more than justified the cost of the additional step in the manufacture of the laminate.

While the invention has been described with respect to the details of a preferred embodiment, many changes and variations will become apparent to those skilled in the art upon reading this description. Such can obviously be made without departing from the scope of the invention.

Having thus described the invention, what is claimed is:

1. In a thin flat laminar battery of the kind having first and second end terminals, a portion of said first end terminal being folded around one edge of said battery to be accessible on the same side as said second end terminal, the improvement which comprises an insulating sheet between the superposed portions of the end terminals, said superposed portions consisting of said folded-around portion of said first end terminal and the confronting portion of said second end terminal, said insulating sheet consisting of a laminate comprising paper, a barrier layer of liquid impermeable insulating material on said paper, and a layer of adhesive on said insulating material and adhering said insulating sheet to said second end terminal.

2. The structure of claim 1, in which said insulating material is polyethylene, and in which said adhesive is a copolymer of ethylene and vinyl acetate.

3. A laminate useful as a carrier web and interterminal insulator in the manufacture of laminar batteries, comprising a sheet of paper, a thin layer of low density polyethylene on one surface of and adhering to said sheet, and a thin layer of ethylene/vinyl acetate adhesive on said layer of polyethylene.

4. The laminate of claim 3, in which said polyethylene layer contains a visible pigment.

5. As a carrier web and end cell insulator for laminar batteries, a laminate of paper, a layer of thermoplastic liquid impervious resin on one surface of said paper, and an overlayer on said resin of a heat sealing adhesive.

6. The structure of claim 1, in which said insulating sheet extends beyond the borders of said second end terminal and is formed with an aperture to admit an electrical contact to said second end terminal.

* * * * *